(12) United States Patent
Lee et al.

(10) Patent No.: US 9,737,743 B1
(45) Date of Patent: Aug. 22, 2017

(54) METHOD OF ASBESTOS DETOXIFICATION

(71) Applicant: INDUSTRY-ACADEMIC COOPERATION FOUNDATION, YONSEI UNIVERSITY, Seoul (KR)

(72) Inventors: Yongjae Lee, Seoul (KR); Mihye Kong, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/180,671

(22) Filed: Jun. 13, 2016

(30) Foreign Application Priority Data

Feb. 12, 2016 (KR) .......................... 10-2016-0016269

(51) Int. Cl.
*A62D 3/36* (2007.01)
*B09B 3/00* (2006.01)
*A62D 101/41* (2007.01)

(52) U.S. Cl.
CPC .............. *A62D 3/36* (2013.01); *B09B 3/0066* (2013.01); *A62D 2101/41* (2013.01)

(58) Field of Classification Search
CPC ............................ A62D 3/36; A62D 2101/41
USPC ........................................................ 588/300
See application file for complete search history.

(56) References Cited

FOREIGN PATENT DOCUMENTS

| JP | 2009-240855 | 10/2009 |
|---|---|---|
| JP | 4923179 B2 | 4/2012 |
| KR | 10-2013-0004115 | 1/2013 |
| KR | 101255849 B1 | 4/2013 |

*Primary Examiner* — Edward Johnson
(74) *Attorney, Agent, or Firm* — Hauptman Ham, LLP (57) ABSTRACT

Provided is a method of asbestos detoxification including: preparing asbestos which is a treatment target for detoxification and carbon dioxide; and pressing the asbestos and the carbon dioxide with a pressure of 1 to 5 GPa and treating the asbestos and the carbon dioxide at a temperature of 100 to 250° C., wherein since the asbestos is not subjected to chemical pre-treatment, as compared to the existing technologies in which the chemical pre-treatment is necessary, treatment cost may be reduced, and another concern for environmental contamination may be prevented in advance, and accordingly, the asbestos is appropriate for recycling through detoxification as well as waste treatment.

6 Claims, 7 Drawing Sheets

METHOD OF ASBESTOS DETOXIFICATION

CROSS-REFERENCE TO RELATED APPLICATIONS

This application claims priority under 35 U.S.C. §119 to Korean Patent Application No. 10-2016-0016269, filed on Feb. 12, 2016, in the Korean Intellectual Property Office, the disclosure of which is incorporated herein by reference in its entirety.

TECHNICAL FIELD

The following disclosure relates to a method of asbestos detoxification, and specifically, to a method of asbestos detoxification capable of minimizing adverse effects on a human body by destroying fiber tissue of asbestos while intactly maintaining excellent properties of the asbestos.

BACKGROUND

Figure 1:
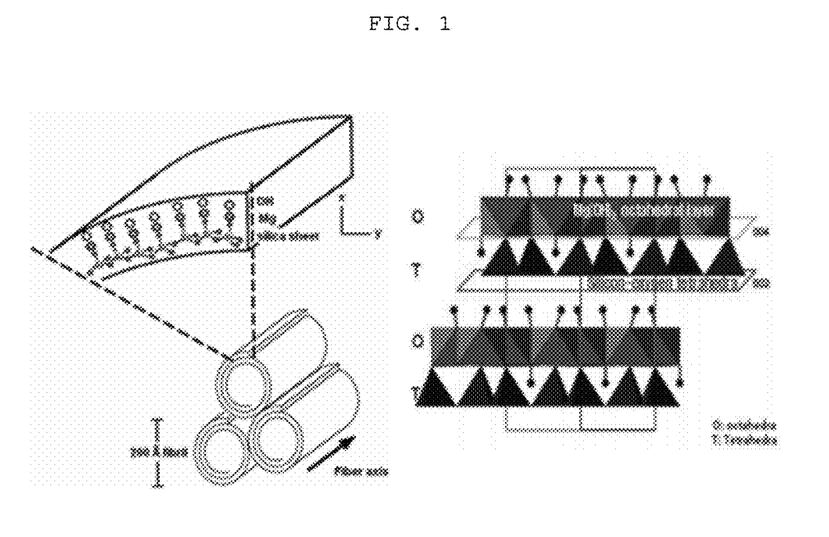
FIG. 1 shows a fibrous tissue of asbestos.

Asbestos is a silicate mineral having a cylindrical form, an acicular (needle-shaped) crystal form, and a fibrous crystal form, excavated from the natural world. There are six kinds of asbestos, which are divided into two mineral groups, that is, a serpentine group and an amphibole group. In particular, tremolite which is one kind of amphibole is formed in a crystal structure having a double chain configured by covalently bonding two or three edges of $SiO_4$ tetrahedrons, as a main frame, as shown in FIG. 1. Here, in the double chain, six $SiO_4$ tetrahedrons are formed in an annular shape, and are repeated, such that the chain is arranged to be long along an axis. The arrangement form allows the tremolite to have fibrous morphological variants.

The asbestos is a silicate mineral originally included in a rock and having a fibrous shape. The asbestos may be easily broken down into fine sized fibers to make thread and cloth, and may be physically robust and chemically inert (against acid and alkali), and have high insulation against electricity and heat.

The asbestos feels like a feather or silk, and has flame retardancy, and is incorrodible, such that it was widely used in more than 3000 various applications such as home appliances, building insulation, automotive brake linings and various industrial processes in the past. However, it became known in the mid-$20^{th}$ century that asbestos causes diseases such as a lung cancer, etc., when inhaled into the respiratory organs, such that various regulations have been implemented. However, since the asbestos have already been used for various materials for a long period of time, the asbestos is widely dispersed in our living environment along with other minerals, such that it is significantly difficult to reduce the concentration thereof.

Figure 2A:
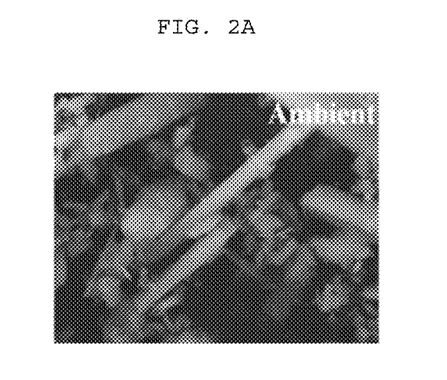
FIG. 2A is a microscope image of the asbestos, Tremolite.
Figure 2B:
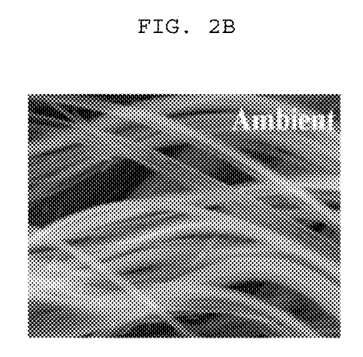
FIG. 2B is a microscope image of the asbestos, Chrysotile.

However, all of the asbestos minerals are not dangerous, but it is dangerous only when the asbestos forms a fibrous shape as shown in FIG. 2A and FIG. 2B. For reference, FIG. 2A is a microscope image of a fiber tissue of Tremolite ($[Ca_2Mg_2SiO_8O_{22}(OH)_2]n$) which is one kind of asbestos, and FIG. 2B is a microscope image of a fiber tissue of Chrysotile ($[Mg_3Si_2O_5(OH)_4]n$) which is also one kind of asbestos.

Once asbestos dust is inhaled through the respiratory organs, it causes health problems. However, it is known that the inhalation of the asbestos dust does not necessarily mean the cause of diseases, but when the asbestos dust of which a length is 5 μm or more, a diameter is 2 μm or less, and an aspect ratio is 5:1 or more is mainly attached to lung tissue, diseases occur. As an inhalation amount of the asbestos dust is increased, and an inhalation period thereof is increased depending on occupations, risk of developing diseases such as asbestosis, lung cancer, mesothelioma, pleural thickening, etc., is also rapidly increased.

Toxicity to a human body caused by the asbestos is related with the kinds of asbestos minerals, a particle size, chemical composition, surface characteristics, durability, etc., of the asbestos mineral. Chrysotile is a type of asbestos that dissolves in a body fluid contained in a lung and has a low toxicity, while tremolite is a type of asbestos that has low solubility and large durability but has the highest toxicity. It is reported from results of a clinical trial that the tremolite excavated in Korea is significantly and highly toxic.

The asbestos is classified as a carcinogenic hazardous material, such that usages thereof are limited. However, the asbestos was widely used for buildings and house wares etc., in the past, such that it is a big challenge to treat waste products thereof, and various technologies for treating waste materials mixed with the asbestos have been developed. A process of removing toxicity to a human body caused by the asbestos refers to "detoxification", wherein the toxicity to the human body caused by the asbestos is removed mainly by destroying fibrous tissues of the asbestos.

There are technologies of injecting carbon dioxide ($CO_2$) into the asbestos to detoxify the asbestos according to the related art [Japanese Patent Publication No. 4923179 (Feb. 17, 2012), Korean Patent Publication No. 1255849 (Apr. 17, 2013)], wherein the asbestos is pre-treated with a chemical material such as an alkaline solution to separate Ca or Mg from the asbestos such as Tremolite or Chrysotile, and Ca or Mg is combined with the injected $CO_2$, thereby producing carbonate mineral. Through these methods, the fiber tissue which is connected to be long as a chain is destroyed, and a material having the carbonate mineral as a main component is rather produced, such that toxicity to the human body caused by the asbestos may be reduced.

However, the above-described method of asbestos detoxification according to the related art requires the chemical pre-treatment of the asbestos, such that treatment cost may be increased, and another concern for environmental contamination may be included. Further, the chemical treatment of the asbestos allows the asbestos to be converted into the carbonate mineral which is completely different from the asbestos, such that excellent properties of the asbestos are completely lost. Therefore, the above-described method of asbestos detoxification is merely a method of treating waste products mixed with the asbestos, that is, recycling of the asbestos is not considered at all in this technology.

SUMMARY

An embodiment of the present invention is directed to providing a method of asbestos detoxification capable of removing toxicity to a human body caused by asbestos even without performing a specific chemical pre-treatment, and intactly maintaining unique properties of the asbestos by not changing intrinsic chemical components of the asbestos.

In one general aspect, a method of asbestos detoxification includes: preparing asbestos which is a treatment target for detoxification and carbon dioxide; and treating the asbestos and the carbon dioxide under a pressure of 1 to 5 GPa and at a temperature of 100 to 250° C.

Here, since the asbestos may not be subjected to chemical pre-treatment, as compared to the existing technologies in which the chemical pre-treatment is necessary, treatment cost may be reduced, and another concern for environmental contamination that may be resulted from asbestos detoxification may be prevented in advance.

In addition, the carbon dioxide may be solidified. However, as long as a sufficient amount of the carbon dioxide is capable of reacting with the asbestos, it is not specifically limited to the solidified carbon dioxide. Further, the pressing of the carbon dioxide with 1 to 5 GPa, a diamond anvil cell (DAC) device may be used. However, a pressure device of the present invention is not specifically limited to the DAC device as long as the above-mentioned pressure state is capable of being obtained.

In addition, in the treating the asbestos and the carbon dioxide under a pressure of 1 to 5 GPa and at a temperature of 100 to 250° C., it is preferable that pressing and heating may be repeatedly and alternately performed, such that pressure and temperature may be raised by stages up to the pressure of 1 to 5 GPa and the temperature of 100 to 250° C., wherein it is not necessary to repeat the pressing and the heating in order to obtain technical effects of the present invention.

Since the chemical pre-treatment for the asbestos is not separately required, treatment cost may be reduced, and a concern for environmental contamination that may occur during the asbestos detoxification may be removed in advance. In addition, a composition of the asbestos is not changed while removing toxicity to a human body caused by the asbestos, such that excellent properties of the asbestos may be utilized. That is, the asbestos is not a waste material to be discarded, but is reborn as a new material in which toxicity to a human body is removed while retaining excellent properties of the asbestos.

BRIEF DESCRIPTION OF THE DRAWINGS

FIGS. 5A and 5B are microscope images of asbestos treated according to the method of asbestos detoxification according to an exemplary embodiment of the present invention, and specifically,
FIGS. 6A and 6B are microscope images of asbestos treated with high temperature/high pressure in a state in which $H_2O$ is injected rather than injecting $CO_2$, and specifically.

DETAILED DESCRIPTION OF MAIN ELEMENTS

100: Pressure device
110: Pressing means
120: Gasket
121: Through hole

DETAILED DESCRIPTION OF EMBODIMENTS

Figure 3A:
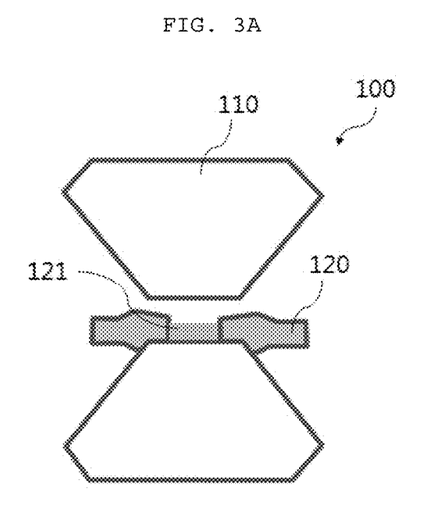
FIG. 3A and FIG. 3B show a pressure device according to an exemplary embodiment of the present invention.
Figure 3B:
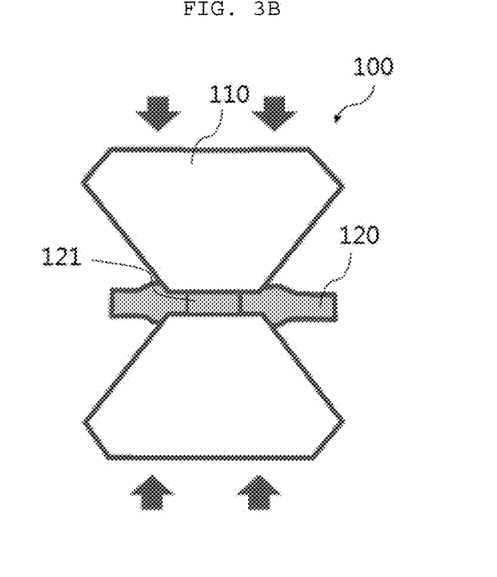

FIG. 3A and FIG. 3B show a pressure device 100 according to an exemplary embodiment of the present invention.

The pressure device 100 includes a gasket 120 into which a sample, i.e., a compression target is inserted and pressing means 110 that apply pressure to the sample, i.e., the compression target.

The gasket 120 includes a through hole 121 formed at a predetermined point, preferably, in the center. Asbestos, i.e., treatment target, and solidified carbon dioxide ($CO_2$) are inserted together into the through hole 121. The solidified carbon dioxide may be used in an amount 0.5 to 2 times that of the asbestos, preferably, about 1 time the amount as the asbestos (on the basis of volume ratio).

In a state in which the asbestos and the solidified carbon dioxide are inserted together into the through hole 121 of the gasket 120, the pressing means 110 pressurize the asbestos and the solidified carbon dioxide at the same time at both ends of the through hole 121. In the present exemplary embodiment, the pressing means 110 have a diamond shape, and have a constitution adopted to observe a change in asbestos components for each process through X-ray diffraction (XRD) while simultaneously obtaining high pressure. The pressure device itself is generally known as a diamond anvil cell (DAC) device.

In an exemplary embodiment of the present invention, the expensive DAC device is used to observe the effects of the present invention for each process through XRD. However, it is obvious to a person skilled in the art that the DAC device is not necessarily used under circumstances (in commercialization process) in which observation for each process is not required, and any kinds of pressure device (for example, a high-pressure cylinder device, and a high-pressure press device) may be adopted as long as high pressure is capable of being obtained.

The present invention is characterized in that heating and pressing are directly performed on the asbestos and the solidified carbon dioxide without chemical pre-treatment. It could be confirmed through microscopic observation that in the state in which the asbestos and the solidified carbon dioxide are inserted, when the asbestos and the solidified carbon dioxide are maintained at a pressure of 1 to 5 GPa and a temperature of 100 to 250° C., unique fiber tissue of the asbestos are destroyed. In particular, when the pressure is 4 GPa, and the temperature is 200° C., optical results could be obtained.

Figure 5A:
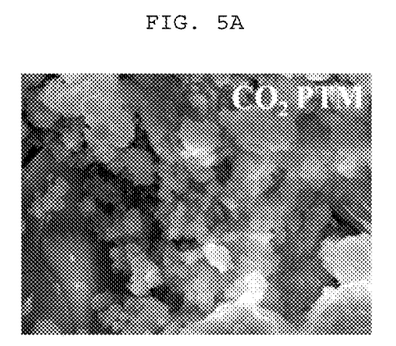
FIG. 5A is a microscope image of Tremolite.
Figure 5B:
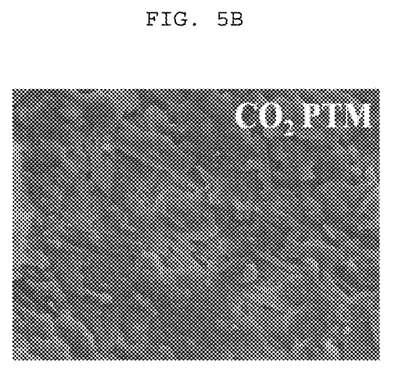
FIG. 5B is a microscope image of Chrysotile.

FIG. 5A is a microscope image of Tremolite through which detoxification is performed according to an exemplary embodiment of the present invention, and FIG. 5B is a microscope image of Chrysotile through which detoxification is performed according to an exemplary embodiment of the present invention.

As shown in FIGS. 5A and 5B, it could be confirmed that the asbestos through which the detoxification is performed according to an exemplary embodiment of the present invention completely lost its own unique fiber tissue. Upon considering that the toxicity to a human body caused by the asbestos comes from the unique fiber tissue morphology of the asbestos, it is determined that the toxicity to the human body is removed from the asbestos through which the detoxification is performed according to the present invention.

Figure 6A:
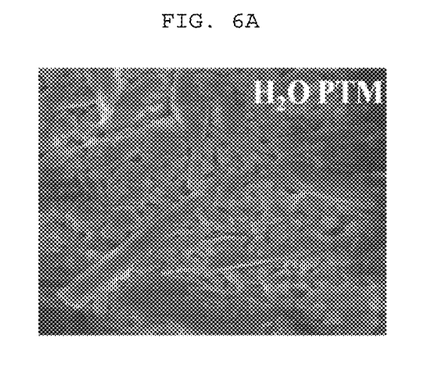
FIG. 6A is a microscope image of Tremolite.
Figure 6B:
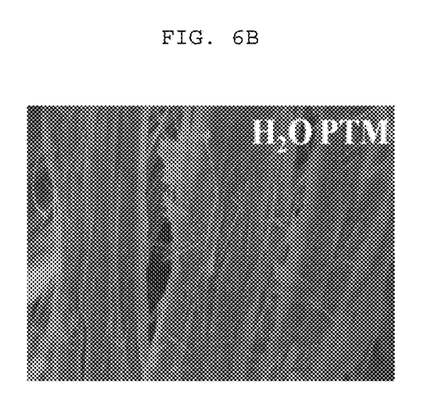
FIG. 6B is a microscope image of Chrysotile.

For comparison, water ($H_2O$) instead of using the solidified carbon dioxide and the asbestos were inserted, and detoxification (heating and pressing) as described above was performed thereon. However, as a result, it could be confirmed that the fiber tissue were maintained as they are as shown in FIG. 6A and FIG. 6B. Accordingly, it could be confirmed that three essential configurations (carbon dioxide, pressure range, and temperature range) according to the present invention are factors which are necessarily required for the method of asbestos detoxification.

Figure 4:
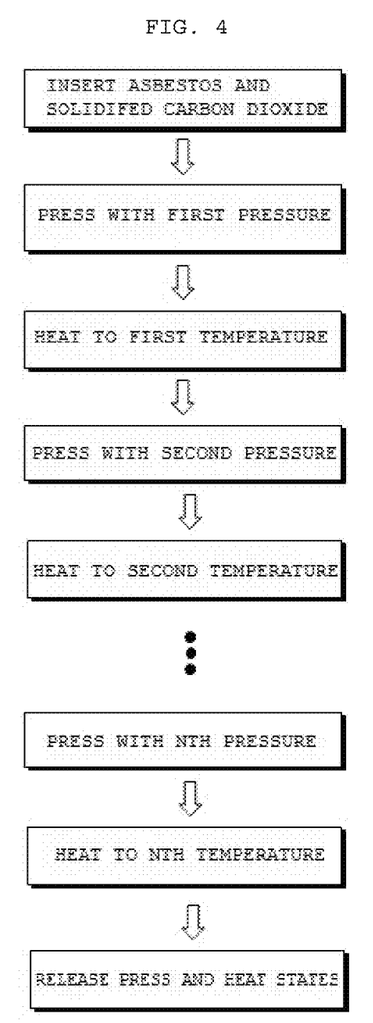
FIG. 4 is a flow chart showing a method of asbestos detoxification according to an exemplary embodiment of the present invention.

Upon reviewing a process of the detoxification method according to the present invention with reference to FIG. 4, even though it is possible to raise pressure and temperature at a time to the suggested ranges thereof (pressure of 1 to 5 GPa and temperature of 100 to 250° C.), it was confirmed that it was more effective to raise temperature and pressure by stages while alternately between heating and pressing, in view of conversion into more complete fibrous tissue morphology, and time and energy savings. That is, the process is divided into several steps until the temperature and the pressure are reached at the final desired temperature (Nth temperature) and the final desired pressure (Nth pressure). Then, the pressure and the temperature may be raised by applying a predetermined pressure and raising the temperature to a predetermined temperature for each step, and in a next step, applying a higher predetermined pressure than that of the previous step, and raising the temperature to a higher predetermined temperature than that of the previous step, i.e., alternately raising the pressure and the temperature by stages.

For example, in a state in which the asbestos and the solidified carbon dioxide are inserted into the pressure device 100, the pressure is firstly applied with 0.53 GPa corresponding to a first pressure. Then, the asbestos and the solidified carbon dioxide are heated to 160° C. corresponding to a first temperature in a state in which the pressure is not controlled, and maintained for 1 hour (see FIG. 7). Next, the pressure is applied with 0.84 GPa corresponding to a second pressure, and the asbestos and the solidified carbon dioxide are heated to 170° C. corresponding to a second temperature without controlling the pressure, and maintained for 1 hour. The pressing and the heating are continuously repeated as described above until the desired pressure and the desired temperature are reached. Specifically, the pressure is applied with 1.26 GPa, and the asbestos and the solidified carbon dioxide are heated up to 200° C. and maintained for 1 hour, and then the pressure is applied with 3.8 GPa, and the asbestos and the solidified carbon dioxide are heated up to 220° C. and maintained for 1 hour, and after that, the pressure is applied with 5.22 GPa, and the temperature is intactly maintained. Next, the heating and the pressing states are released.

In the above-description, there is provided an example in which the heating and the pressing are repeated by stages in order to reach the desired pressure state (1 to 5 GPa) and the desired temperature state (100 to 250° C.). However, the technical effects of the present invention are entirely obtained through the above-described pressure range (1 to 5 GPa) and the temperature range (100 to 250° C.), and accordingly, the number of steps in which the heating and the pressing are repeated corresponds to a technical matter that can be selected and applied by a person skilled in the art as needed.

Figure 7:
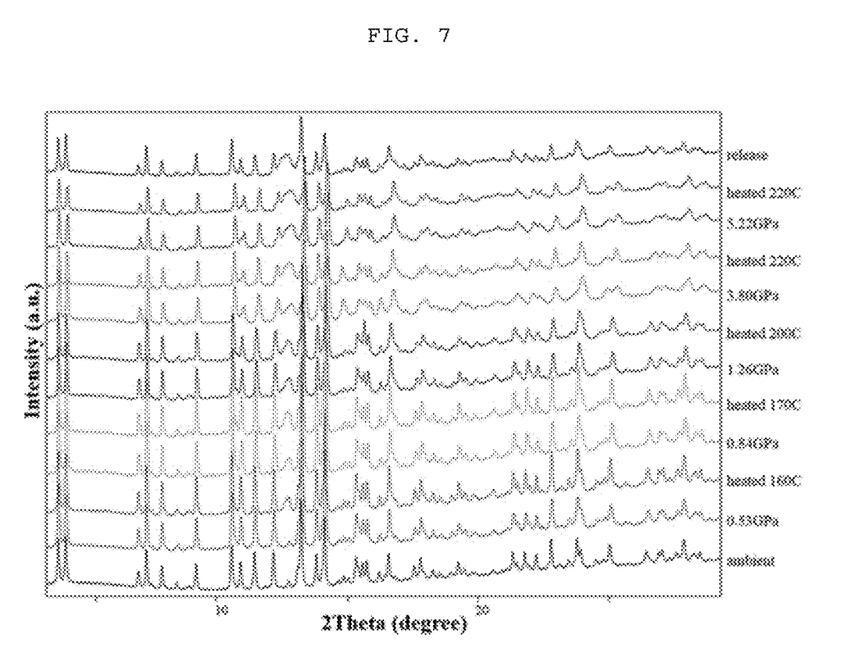
FIG. 7 shows XRD analysis results of Tremolite treated according to an exemplary embodiment of the present invention.

FIG. 7 shows XRD analysis results for each step obtained by inserting Tremolite and the solidified carbon dioxide into the pressure device and repeating the heating and the pressing for each step as described above.

It could be appreciated that positions of peaks were not significantly changed in the state in which the heating and the pressing are maintained. That is, the positions of the peaks of the XRD analysis results before the detoxification, and the positions of the peaks of the XRD analysis results after the final detoxification were almost not changed. It could be confirmed from the above analysis results that the intrinsic component of the asbestos was not chemically changed at all.

That is, according to the related art, the asbestos is detoxified by using carbon dioxide, and the component itself of the asbestos is converted into the carbonate mineral through chemical treatment. On the contrary, according to the detoxification of the present invention, the component itself of the asbestos is not specifically changed, but only the fiber tissue was destroyed. Accordingly, even though the toxicity to the human body caused by the asbestos is removed, many parts of excellent properties of the asbestos are maintained as they are. Consequently, the present technology may refer to a technology of recycling the asbestos rather than discarding the asbestos as a waste material.

In particular, the method of asbestos detoxification of the present invention includes directly pressing and heating the asbestos together with the solidified carbon dioxide without chemical pre-treatment, which is unlike the related art, such that another concern for environmental contamination that may be resulted from the chemical pre-treatment may be prevented in advance.

What is claimed is:

1. A method of asbestos detoxification comprising:
   preparing asbestos which is a treatment target for detoxification and carbon dioxide; and
   treating the asbestos and the carbon dioxide under a pressure of 1 to 5 GPa and at a temperature of 100 to 250° C.

2. The method of claim 1, wherein the carbon dioxide is solidified.

3. The method of claim 1, wherein in the pressing of the carbon dioxide with 1 to 5 GPa, a pressure device is used, the pressure device being selected from the group consisting of a diamond anvil cell (DAC) device, a high-pressure cylinder device, and a high-pressure press device.

4. The method of claim 1, in treating the asbestos and the carbon dioxide under a pressure of 1 to 5 GPa and at a temperature of 100 to 250° C., pressing and heating are performed alternately that the pressure and the temperature are raised by stages up to the pressure of 1 to 5 GPa and the temperature of 100 to 250° C.

5. The method of claim 1, wherein the asbestos is not subjected to chemical pre-treatment.

6. The method of claim 1, wherein the asbestos is Tremolite or Chrysotile.

* * * * *